United States Patent
Nolte et al.

(10) Patent No.: US 7,039,681 B2
(45) Date of Patent: May 2, 2006

(54) METHOD OF INITIATING A TELECOMMUNICATION SESSION BETWEEN A RESOURCE PROVIDER AND A PATRON

(75) Inventors: Diana Brown Nolte, Port Salerno, FL (US); Suzanne Kennedy Rajchel, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 731 days.

(21) Appl. No.: 09/783,842

(22) Filed: Feb. 15, 2001

(65) Prior Publication Data

US 2002/0152312 A1    Oct. 17, 2002

(51) Int. Cl.
  *G06F 15/16*   (2006.01)
  *G06F 17/60*   (2006.01)
(52) U.S. Cl. ................... 709/207; 709/202; 705/80
(58) Field of Classification Search ................ 709/227, 709/220, 229, 238, 203, 206, 207, 208; 707/1, 707/3, 9; 370/328; 379/114.24; 705/80
  See application file for complete search history.

(56) References Cited

U.S. PATENT DOCUMENTS

| | | | |
|---|---|---|---|
| 6,026,151 A * | 2/2000 | Bauer et al. ........... 379/114.24 |
| 6,070,157 A * | 5/2000 | Jacobson et al. ............... 707/1 |
| 6,134,536 A * | 10/2000 | Shepherd ...................... 705/80 |
| 6,205,126 B1 * | 3/2001 | Moon .......................... 709/229 |
| 6,295,294 B1 * | 9/2001 | Odlyzko ..................... 709/238 |
| 6,304,872 B1 * | 10/2001 | Chao ............................ 707/5 |
| 6,636,491 B1 * | 10/2003 | Kari et al. ................... 370/328 |
| 6,654,749 B1 * | 11/2003 | Nashed ....................... 707/10 |
| 6,658,414 B1 * | 12/2003 | Bryan et al. ................... 707/9 |
| 6,735,585 B1 * | 5/2004 | Black et al. ................... 707/3 |
| 2001/0056412 A1 * | 12/2001 | Kutsuzawa et al. .......... 705/80 |
| 2002/0035474 A1 * | 3/2002 | Alpdemir .................... 704/270 |
| 2002/0073182 A1 * | 6/2002 | Zakurdaev et al. ......... 709/220 |

* cited by examiner

*Primary Examiner*—Paul H. Kang

(57) ABSTRACT

An enhanced data networking service is disclosed that assists a patron in locating a resource provider who might be capable of providing the resource (e.g., information, goods, realty, intangibles, or services, etc.) sought by the patron and also initiates a telecommunication session between the patron and the resource provider so that they may communicate and provide the patron with the resource sought. The telecommunication session can be a voice telecommunications session, video telecommunications session, or a text telecommunications session. The telecommunications session can be conducted via the public switched telephone network or a data network such as the Internet. An illustrative embodiment of the present invention comprises: receiving, via a data network, at least one keyword from a patron; querying a database with the at least one keyword to select a resource provider; and initiating a telecommunication session between the patron and the resource provider.

18 Claims, 3 Drawing Sheets

100

METHOD OF INITIATING A TELECOMMUNICATION SESSION BETWEEN A RESOURCE PROVIDER AND A PATRON

FIELD OF THE INVENTION

The present invention relates to telecommunications service in general, and, more particularly, to a data processing system that assists a patron in contacting a resource provider who might be capable of providing a resource (e.g., information, goods, realty, intangibles, or services, etc.) sought by the patron.

BACKGROUND OF THE INVENTION

The ubiquitous presence of the Internet and the World Wide Web has enabled many new services. For example, eBay.com™ provides a global simultaneous auction on millions of items and search engines like Yahoo™, Dogpile™, Northern Lights™, and Google™ enable people to find resources with efficiency that was not possible just a few years ago. As useful and popular as these services are, there still remains the need for enhanced services.

SUMMARY OF THE INVENTION

Some embodiments of the present invention provide enhanced data networking service without some of the costs and disadvantages of services in the prior art. In particular, the illustrative embodiments of the present invention assist a patron in locating a resource provider who might be capable of providing the resource (e.g., information, goods, realty, intangibles, or services, etc.) sought by the patron. Furthermore, the illustrative embodiments of the present invention not only assist the patron in identifying the resource provider, but the illustrative embodiments also initiate a telecommunication session between the patron and the resource provider so that they may communicate and provide the patron with the resource sought.

In accordance with the illustrative embodiments of the present invention, the telecommunication session can take any of the following types:
 i. a voice telecommunications session via the public switched telephone network, or
 ii. a video telecommunications session via the public switched telephone network (this type of telecommunications session is commonly called "videophone"), or
 iii. a text telecommunications session via the public switched telephone network, or
 iv. a voice telecommunications session via a data network, such as the Internet (this type of telecommunications session is commonly known as "Internet telephony" or "voice over IP"), or
 v. a video telecommunications session via a data network
 vi. a text telecommunications session via a data network (this type of telecommunications session is sometimes called instant messaging), or
 vii. any combination of i, ii, iii, iv, v, and vi.

There are four illustrative embodiments of the present invention.

The salient characteristics of the first illustrative embodiment is that a database of resource providers is compiled, a patron provides one or more keywords indicative of the resource sought, and the illustrative embodiment uses the database and keywords to unilaterally select a resource provider. The keyword(s) can be provided directly by the patron to the system. Alternatively, the keyword can be provided to the system by an independent system, for example a search engine or e-commerce web site, which has by inference determined that the user might like to interact with a resource provider. The illustrative embodiment then automatically initiates a telecommunication session between that resource provider and the patron. The first illustrative embodiment might select the resource provider with whom to initiate the session based on whether the resource provider is immediately available to communicate with the patron and whether the patron desires immediate communication.

In contrast, the second illustrative embodiment does not unilaterally select a resource provider with whom to connect the patron. Rather, the second illustrative embodiment uses the database and keywords to determine a plurality of candidate resource providers who are likely to be capable of providing the resource sought, which is either sought by a patron or inferred to be sought by a patron. The second illustrative embodiment then transmits a list of the candidate resource providers to the patron and allows the patron to decide with whom he or she wishes to communicate. The second illustrative embodiment then initiates a telecommunication session between the patron and the resource provider with whom he or she desires to communicate. The second illustrative embodiment might also transmit to the patron an indication of whether each candidate resource is immediately available to communicate with the patron. This information can affect the patron's decision to communicate with a given resource provider.

The third illustrative embodiment receives a request from a patron, or alternatively a request from another system inferring the request from the patron, to find a resource provider to provide a particular resource. The third illustrative embodiment then conducts an auction to determine the lowest-cost resource provider to provide the resource for the patron. At the conclusion of the auction, the third illustrative embodiment automatically initiates a telecommunication session between the patron and the resource provider who won the auction. The third illustrative embodiment might qualify resource providers for the auction based on whether the resource provider is immediately available to communicate with the patron and whether the patron desires immediate communication.

Like the third illustrative embodiment, the fourth illustrative embodiment also receives a request to find a resource provider to provide a particular resource, which request is provided by either the patron directly or is inferred on behalf of the patron and sent by another system. But unlike the third illustrative embodiment, the fourth publishes a notice of the resource sought, and receives notice from each of a plurality of candidate resource providers who are interested in providing the resource to the patron. The fourth illustrative embodiment then transmits a list of the candidate resource providers to the patron and allows the patron to decide with whom he or she wishes to communicate. The fourth illustrative embodiment then initiates a telecommunication session between the patron and the resource provider with whom he or she desires to communicate. The fourth illustrative embodiment might also transmit to the patron an indication of whether each candidate resource is immediately available to communicate with the patron. This information can affect the patron's decision to communicate with a given resource provider.

The common aspect of the four illustrative embodiments is that each: (i) seeks to assist a patron in identifying a resource provider who can provide the resource sought by the patron, and (ii) initiates a telecommunication session between the patron and a resource provider.

An illustrative embodiment of the present invention comprises: receiving, via a data network, at least one keyword from a patron; querying a database with the at least one keyword to select a resource provider; and initiating a telecommunication session between the patron and the resource provider.

DETAILED DESCRIPTION

Figure 1:
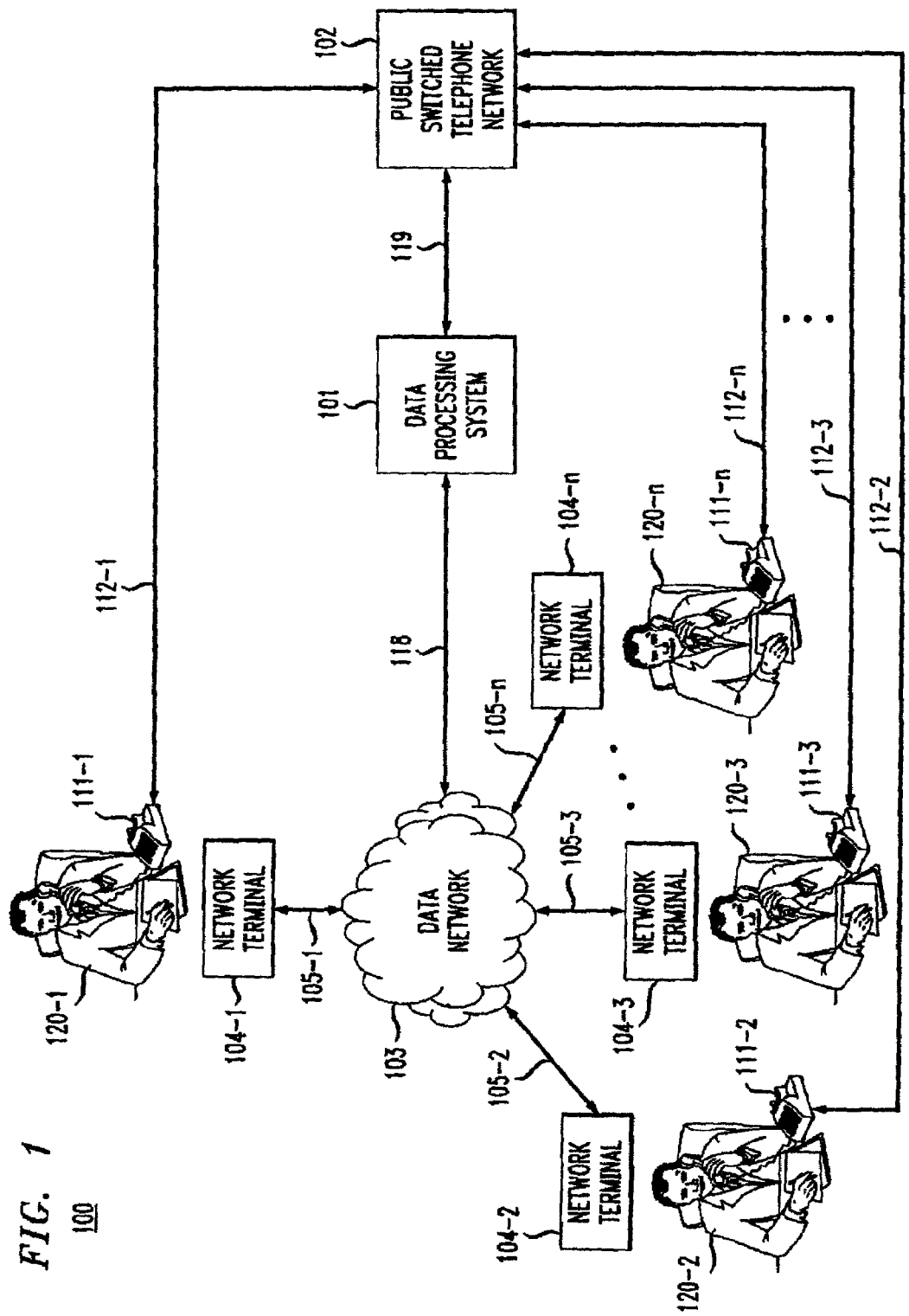
FIG. 1 depicts a block diagram of a system in accordance with the illustrative embodiment of the present invention.

FIG. 1 depicts a block diagram of a system in accordance with the illustrative embodiment of the present invention. System 100 comprises: data processing system 101, public switched telephone network 102, data network 103, a plurality of network terminals 104-1 through 104-n, which are respectively connected to data network 103 by a plurality of telecommunications links 105-1 through 105-n, a plurality of telecommunications terminals 111-1 through 111-n, which are respectively connected to public switched telephone network 102 by a plurality of telecommunications links 112-1 through 112-n, telecommunications link 118, telecommunications link 119, patron 120-1, and a plurality of resource providers 120-2 through 120-n.

Data processing system 101 comprises one or more computers that perform the functionality described below with respect to at least one of FIGS. 2 through 5. For the purposes of this specification, a "data processing system" is defined as one or more computers that can be, but are not necessarily, networked. If data processing system 101 comprises more than one computer, those computers might or might not be internetworked. In either case, data processing system 101 is capable of communicating with network terminals 104-1 through 104-n via telecommunications link 118, data network 103, and telecommunications links 105-1 through 105-n, respectively, and public switched telephone network 102 via telecommunications link 119. In accordance with the illustrative embodiment of the present invention, data processing system 101 is configured to function as a World Wide Web (i.e., hypertext transfer protocol) server.

Data processing system 101 is advantageously always aware of whether a resource provider is immediately available to communicate with a patron, and if so, in accordance with which types of telecommunications sessions. The types of telecommunications sessions are described in detail below. Data processing system 101 can be continually aware of whether a resource provider is immediately available to communicate with a patron by having each resource provider continually register, either manually or automatically, with data processing system 101 to indicate the state of its availability. The resource provider can also register the most preferred device and type of telecommunications session on which he or she is immediatlely available.

Furthermore, data processing system 101 is capable of bridging a telecommunications session between one or more telecommunications terminals accessible via public switched telephone network 102 and one or more network terminals accessible via data network 103. It will be clear to those skilled in the art how to make and use data processing system 101 to accomplish this.

For the purpose of this specification, a "public switched telephone network" is defined as the wireline, wireless, circuit-switched, packet-switched facilities, or any combination thereof which advantageously enable a telecommunication session with telecommunications terminals 111-1 through 111-n. Public switched telephone network 102 comprises all of the switching and transmission facilities normally associated with a public switched telephone network, but has at least one additional capability. Public switched telephone network 102 is also capable of receiving a command from data processing system 101 via telecommunications link 119, which command causes public switched telephone network 102 to initiate a telecommunications session between any two or more of telecommunications terminals 111-1 through 111-n.

For the purposes of this specification, a "telecommunications session" is defined as concurrent bi-directional communications between two or more network terminals and telecommunications terminals, and specifically includes: (i) voice telecommunications sessions, (ii) text telecommunications sessions, and (iii) video telecommunications sessions. For example, a telecommunications session can exist between two network terminals, between two telecommunications terminals, or a between a network terminal and a telecommunications terminal. For the purposes of this specification, a "voice telecommunications session" is defined as concurrent bidirectional human-perceivable audio transmission between a plurality of network and telecommunications terminals. For the purposes of this specification, "text telecommunications session" is defined as concurrent bi-directional text messaging between two or more network terminals. For the purposes of this specification, a "video telecommunications session" is defined as concurrent bi-directional human-perceivable video transmission between a plurality of network and telecommunications terminals. It will be clear to those skilled in the art how to make and use public switched telephone network 102.

Telecommunications links 118 and 119 comprises wireline, wireless, or a combination of wireline and wireless telecommunications facilities. It will be clear to those skilled in the art how to make and use telecommunications link 119.

Each of telecommunications terminals 111-1 through 111-n comprises:
  i. the equipment necessary to receive signals from public switched telephone network 102 and to convert them into audio, video and/or text signals that can be perceived and understood by a human user, and
  ii. the equipment necessary to receive audio, video and/or text signals from a human user and to convert them into signals for delivery to public switched telephone network 102.

It will be clear to those skilled in the art how to make and use each of telecommunications terminals 111-1 through 111-n.

Telecommunications links 112-1 through 112-n comprise the transmission equipment needed to carry signals from public switched telephone network 102 to telecommunications terminals 111-1 through 111-n, respectively, and from telecommunications terminals 111-1 through 111-n to public switched telephone network 102. Each of telecommunications links 112-1 through 112-n comprises wireline, wireless, or a combination of wireline and wireless telecommunications facilities. It will be clear to those skilled in the art how to make and use telecommunications links 112-1 through 112-n. Telecommunications links 112-1 through 112-n can comprise both private and public facilities.

Data network 103 comprises all of the switching and transmission facilities needed to route data between network terminals 104-1 through 104-n and data processing system 101. In accordance with the illustrative embodiment, data network 103 is advantageously the Internet. Data network 103 advantageously comprises the transmission and switching bandwidth needed to enable a telecommunications session between any two or more of network terminals 104-1 through 104-n. It will be clear to those skilled in the art how to make and use data network 103.

Each of network terminals 104-1 through 104-n comprises the equipment and executable program code needed to enable a human user to:
  i. communicate with data processing system 101, and
  ii. participate in a telecommunications session.

In accordance with the illustrative embodiment, each of network terminals 104-1 through 104-n is a computer that comprises a display, keyboard, microphone, speakers, etc. Alternatively, some of network terminals 104-1 through 104-n can be a pager, personal digital assistant or other device. Furthermore, each of network terminals 104-1 through 104-n can be a wireline or wireless terminal. It will be clear to those skilled in the art how to make and use each of network terminals 104-1 through 104-n.

Telecommunications links 105-1 through 105-n comprise the transmission equipment needed to carry signals from data network 103 to telecommunications terminals 104-1 through 104-n, respectively, and from telecommunications terminals 104-1 through 104-n to data network 103. Each of telecommunications links 105-1 through 105-n comprises wireline, wireless, or combination of wireline and wireless telecommunications facilities. It will be clear to those skilled in the art how to make and use telecommunications links 105-1 through 105-*n*.

Figure 2:
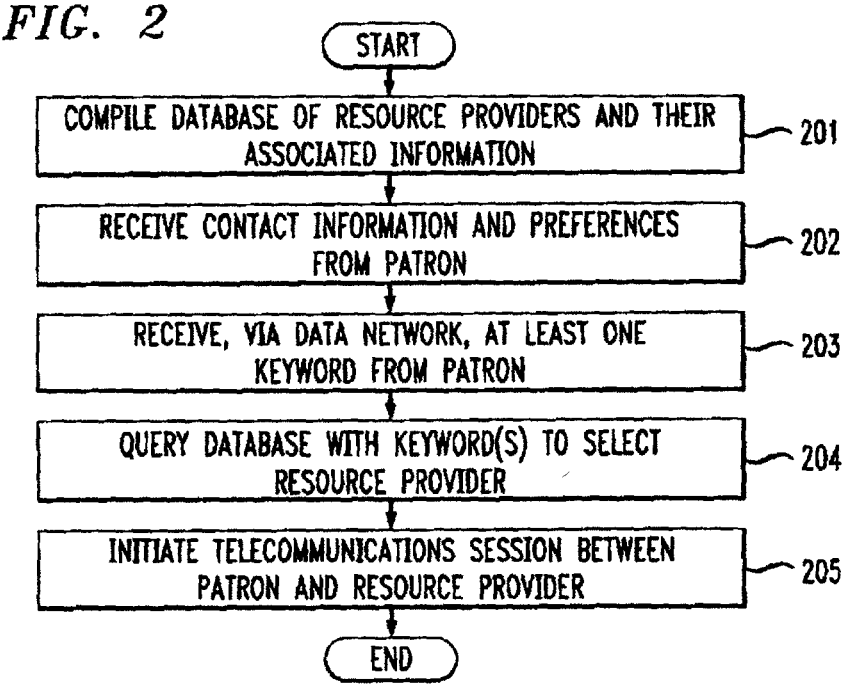
FIG. 2 depicts a flowchart of the operation of the first illustrative embodiment of the present invention.

FIG. 2 depicts a flowchart of the operation of the first illustrative embodiment of the present invention.

At step 201, a database of resource providers is compiled, which database advantageously provides similar functionality to the Yellow Pages® or an Internet search engine (e.g., Yahoo™, Dogpile™, Northern Lights™, or Google™, etc.) For the purposes of this specification, a "resource provider" is defined and a person, natural or otherwise, who endeavors to provide a resource. Example resources include the provision of information, goods, realty, intangibles, or services. A resource provider in accordance with the present invention can provide its resources for remuneration or not.

In addition to the identity of each resource provider, the database also includes:
  1. one or more keywords that are indicative of the resource provider;
  2. an indication of whether the resource provider accepts voice, video, or text telecommunications sessions via public switched telephone network 102, and, if so, the resource provider's contact information for such sessions;
  3. an indication of whether the resource provider accepts voice, video, or text telecommunications sessions via data network 103, and, if so, the resource provider's data network address for such sessions; and
  4. an indication of whether the resource provider is immediately available to communicate with a patron.

Advantageously, each resource provider's entry in the database is indexed by one or more keyword(s) that are indicative of the resource provided by the resource provider. Table 1 depicts an illustrative portion of a database in accordance with the illustrative embodiment of the present invention.

TABLE 1

A Portion of an Illustrative Database in accordance with the First Illustrative Embodiment

| Keyword(s) | Resource Provider | Via PSTN | Via Data Network |
|---|---|---|---|
| . . . | . . . | . . . | . . . |
| ceiling fans | Coriolis Winds, Inc. | No | 23.42.63.93 (voice only) |
| ceramic fish | Flying Clayfish, Inc. | 908-555-4862 (voice only) | No |
| ceramic Elvis molds | Pricilla's House of Ceramics, Inc. | 630-555-3888 (voice and video) | 92.75.222.4 (voice and video) |
| ceramic glazes | Shiny Pots Are Happy Pots, Inc. | 732-555-6644 (voice and video) | No |
| chairs, folding | Origami Seats, Inc. | 483-555-7383 (text only) | 45.26.88.103 (voice only) |
| . . . | . . . | . . . | . . . |

It will be clear to those skilled in the art how to enable data processing system 101 to perform step 201.

At step 202, data processing system 101 receives the contact information and preferences of a patron who desires to use data processing system 101 to locate a resource provider who most closely matches the keyword(s) provided by the patron in step 203. Advantageously, the contact information and preferences include an indication of whether the patron desires to communicate with the resource provider selected in step 204:
  1. via voice, video, or text telecommunications session via public switched telephone network 102, and, if so, the patron's contact information for such session; and
  2. via voice, video, or text telecommunications session via data network 103, and, if so, the patron's data network address for such session; and
  3. immediately or not.

Furthermore, if the patron indicates a willingness to communicate with a resource provider via two or more types of telecommunications sessions, data processing system 101 also receives an indication of the patron's preference for using each of those types. The preferences include an indication of whether the patron is immediately available to be communicated with, and by what type of terminal device. Secondly, contact information and preferences include an indication of whether a patron desires to communicate with the resource provider selected in step 204. Table 2 depicts the contact information and preferences for an illustrative patron named "Bob Smith."

TABLE 2

Illustrative Profile for User Bob Smith

| Telecommunication Session Type | Acceptable | Contact | Preference |
|---|---|---|---|
| Via Public Switched Telephone network 102 | Voice, Video | 732-555-2634 | First |
| Via Data Network 103 | Voice | 43.54.23.55 | Second |

It will be clear to those skilled in the art how to enable data processing system 101 to perform step 202.

At step 203, data processing system 101 receives, via data network 103, at least one keyword which is most likely to be universally associated with the resource desired, or inferred to be desired, by the patron. The keyword(s) can be provided directly by the patron in the case where the patron knowingly requests a resource, or by another data processing system, for example a general search engine or e-commerce site, which has inferred that a resource might be useful to the patron. For example, illustrative keywords from patron Bob Smith could be "pottery glaze." It will be clear to those skilled in the art how to enable data processing system 101 to perform step 203.

At step 204, data processing system 101 queries the database compiled in step 201 to determine which resource provider's keywords most closely match the keyword(s) provided by the patron in step 203. For example, the illustrative keyword(s) from patron Bob Smith, "pottery glaze," most closely matches the keywords "ceramic glazes" associated with the resource provider "Shiny Pots Are Happy Pots, Inc."

Furthermore, in step 204 data processing system 101 only considers resource providers who are capable of communicating with the patron via a type of telecommunications session that is acceptable to the patron. And still furthermore, if the patron has indicated that he or she desires to communicate with a resource provider immediately, data processing system 101 only considers in step 204 those resource providers who are available to communicate with the patron immediately.

It will be clear to those skilled in the art how to enable data processing system 101 to perform step 204.

When there are two or more resource provider's whose keywords equally match the keyword(s) provided by the patron in step 203, data processing system 101 can take one of two courses of action. First, data processing system 101 can inform the patron that there is more than one resource provider who matches the patron's keyword(s), and, therefore, the patron might want to conduct another, more narrow search using different keywords. Second, data processing system 101 can select that resource provider who pays the operator of data processing system 101 the largest fee or commission for initiating the telecommunication session between the patron and the resource provider.

At step 205, data processing system 101 automatically initiates a telecommunication session between the patron and the resource provider selected in step 204. In accordance with the illustrative embodiment of the present invention, the operator of data processing system 101 receives a fee or commission for initiating the telecommunication session between the patron and the resource provider. In accordance with step 205, data processing system 101 selects the type of telecommunications session by selecting the patron's most preferred type that is also supported by the selected resource provider.

When data processing system 101 determines that the telecommunication session is to be established via public switched telephone network 102, data processing system 101 commands public switched telephone network 102 to initiate a telecommunications session between the patron and the selected resource provider. Alternatively, when data processing system 101 determines that the telecommunication session is to be established via data network 103, then data processing system 101 commands data network 103 to initiate a telecommunications session between the patron and the selected resource provider.

Figure 3:
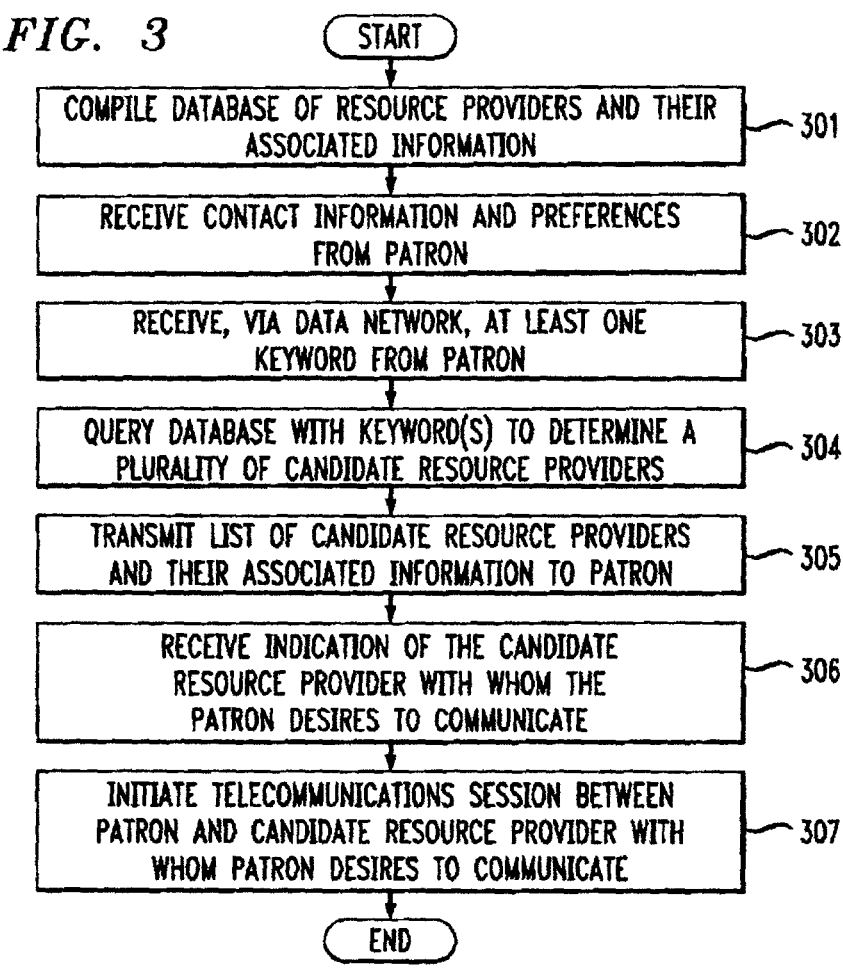
FIG. 3 depicts a flowchart of the operation of the second illustrative embodiment of the present invention.

FIG. 3 depicts a flowchart of the operation of the second illustrative embodiment of the present invention.

At step 301, a database of resource providers is compiled. Step 301 is advantageously identical to step 201 as described above, except that a summary of the resource provider's service, terms, and conditions is also advantageously obtained and associated in the database with the resource provider's keywords. For example, when the keywords for Ken Jones' Law Office are "wills, estate planning," the associated summary might be "I'll write any will for only $99!" It will be clear to those skilled in the art how to enable data processing system 101 to perform step 301.

At step 302, data processing system 101 receives the contact information and preferences from a patron who desires to use data processing system 101 to put the patron in contact with a resource provider who most closely matches the keyword(s) provided by the patron in step 303. Step 302 is advantageously identical to step 202 as described above with respect to FIG. 2.

At step 303, data processing system 101 receives the contact information and preferences of a patron who desires to use data processing system 101 to locate a resource provider who most closely matches the keyword(s) provided by the patron in step 303. Step 303 is advantageously identical to step 203 as described above with respect to FIG. 2.

At step 304, data processing system 101 queries the database compiled in step 301 to determine a plurality of candidate resource providers whose keywords most closely match the keyword(s) and contact information provided by the patron in step 303. It will be clear to those skilled in the art how to enable data processing system 101 to perform step 304. For example, the illustrative keyword(s) "ceramics" most closely matches the keywords "ceramic fish," associated with Flying Clayfish, Inc., "ceramic Elvis molds," associated with Pricilla's House of Ceramics, Inc., and "ceramic glazes" associated with Shiny Pots Are Happy Pots, Inc.

Whereas in step 204 data processing system 101 selects only one resource provider and automatically initiates a telecommunication session with that resource provider, in step 304 data processing system 101 does not seek to select only one resource provider. Instead, in step 304 data processing system 101 selects one or more candidate resource providers whose keywords more closely match the keyword(s) than the keywords of the resource providers that are not selected. It will be clear to those skilled in the art how to enable data processing system 101 to perform step 304.

At step 305, data processing system 101 transmits, via data network 103, a list of the candidate resource providers selected in step 304, and the summary information associated with each to the network terminal associated with the patron. This is to enable the patron to select which resource provider with whom to communicate and to provide the patron with some information on which to reasonably base the decision. The summary information might include any fees or terms & conditions associated with initiating a telecommunications session to a particular resource provider. As part of step 305, data processing system 101 also transmits to the patron an indication of whether each candidate resource is immediately available to communicate with the patron. This information can affect the patron's decision to communicate with a given resource provider. It will be clear to those skilled in the art how to enable data processing system 101 to perform step 305.

At step 306, data processing system 101 receives an indication of candidate resource provider with whom the patron desires to communicate. It will be clear to those skilled in the art how to enable data processing system 101 to perform step 306.

At step 307, data processing system 101 automatically initiates a telecommunication session between the patron and the resource provider indicated in step 306. Step 307 is advantageously identical to step 205 as described above with respect to FIG. 2.

Figure 4:
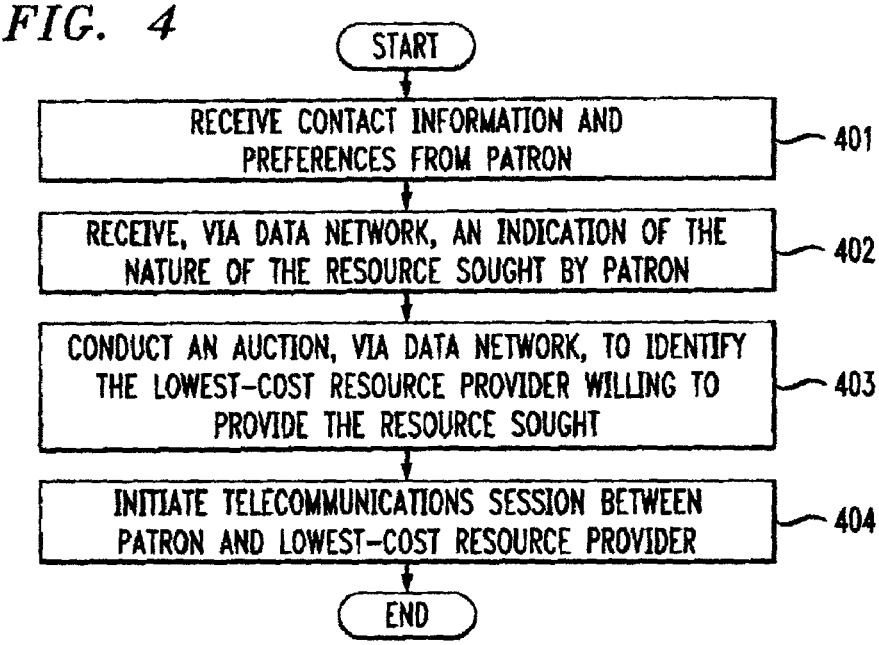
FIG. 4 depicts a flowchart of the operation of the third illustrative embodiment of the present invention.

FIG. 4 depicts a flowchart of the operation of the third illustrative embodiment of the present invention.

At step 401, data processing system 101 receives the contact information and preferences of a patron who desires to use data processing system 101 to locate the lowest-cost resource provider of a resource who is capable of providing the resource sought by the patron as indicated in step 402. Step 401 is advantageously identical to step 202 as described above with respect to FIG. 2.

At step 402, data processing system 101 receives an indication of a resource, either sought directly by a patron or inferred to be sought by the patron indirectly by some independent data processing system. For example, the resource might be "I need someone to write a will for me" or "I need someone to change the oil in my car and I live in Alexandria, Va." The salient characteristic of the indication of the resource sought is that it should enable a potential resource provider to reasonably determine if it is willing to provide the requested resource and, if so, for what remuneration. It will be clear to those skilled in the art how to enable data processing system 101 to perform step 402.

At step 403, data processing system 101 conducts an auction, via data network 101, to identify the lowest-cost resource provider who is willing to provide the service sought by the patron. Such an auction can be conducted through a World Wide Web site and can be analagous to auctions operated by eBay.com. Generally, the auction may be of any type facilitated by a data network and data processing system between multiple parties, and may be one from the class of auctions traditional bid/ask, dutch auction, reverse auction, or any other type of auction. The auction may, but does not have to, be conducted by selecting only those resource providers which are immediately available. From the resource provider who wins the auction, data processing system 101 also advantageously receives an indication of what types of telecommunications sessions the resource provider accepts, the resource provider's contact information, and whether the resource provider is immediately available.

From the resource provider who wins the auction, data processing system 101 also advantageously receives an indication of what types of telecommunications sessions the resource provider accepts and the resource provider's contact information. It will be clear to those skilled in the art how to enable data processing system 101 to perform step 403.

At step 404, data processing system 101 automatically initiates a telecommunication session between the patron and the resource provider who wins the auction in step 403. Step 404 is advantageously identical to step 205 as described above with respect to FIG. 2.

Figure 5:
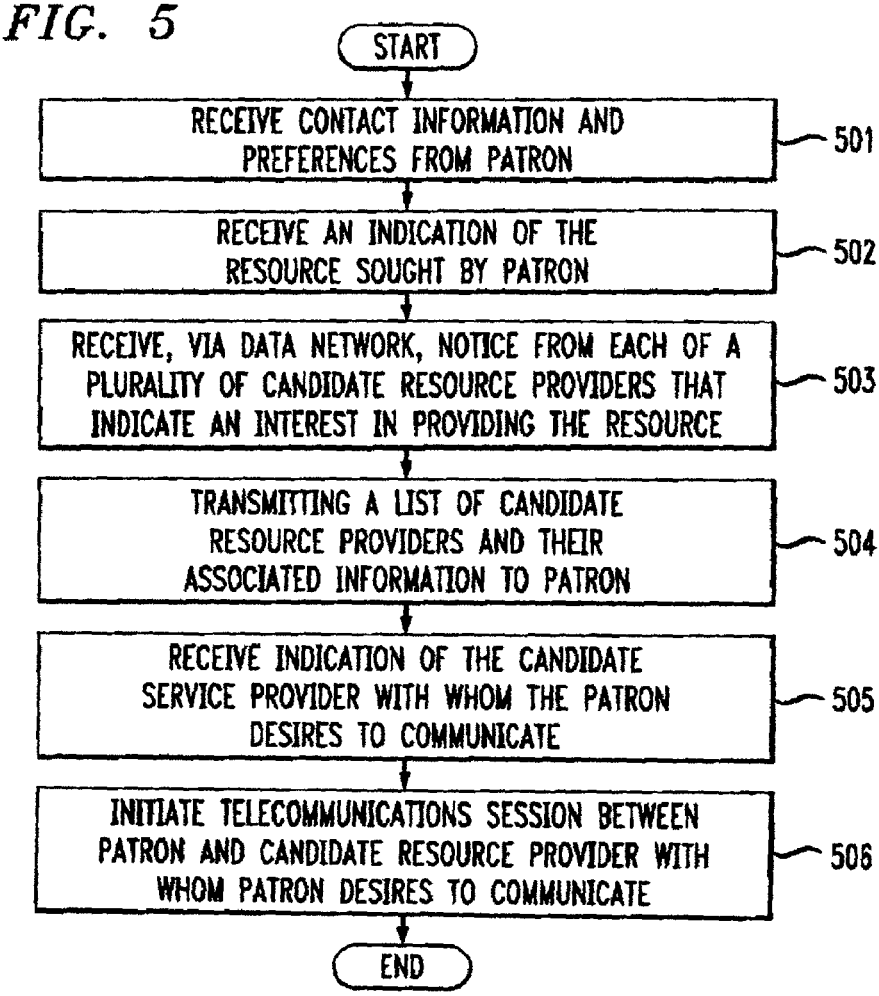
FIG. 5 depicts a flowchart of the operation of the fourth illustrative embodiment of the present invention.

FIG. 5 depicts a flowchart of the operation of the fourth illustrative embodiment of the present invention.

At step 501, data processing system 101 receives the contact information and preferences from a patron who desires to use data processing system 101 to put the patron in contact with a resource provider who is capable of providing the resource sought by the patron as indicated in step 502. Step 501 is advantageously identical to step 202 as described above with respect to FIG. 2.

At step 502, data processing system 101 receives an indication of a resource, either sought directly by a patron or inferred to be sought by the patron indirectly by some independent data processing system. For example, the resource might be "I need someone to write a will for me" or "I need someone to change the oil in my car and I live in Alexandria, Va." The salient characteristic of the indication of the resource sought is that it should enable a potential resource provider to reasonably determine if it is willing to provide the requested resource. It will be clear to those skilled in the art how to enable data processing system 101 to perform step 502.

At step 503, data processing system 101 publishes notice of the patron's request for the resource, and, in response, receives, via data network 103, notice from each of a plurality of candidate resource providers that indicate an interest in providing the resource sought. Data processing system 101 advantageously also receives from each of the candidate resource providers a summary of the terms and conditions on which the resource provider is willing to provide the service, and data processing system 101 also advantageously receives on or more of: an indication of what types of telecommunications sessions the resource provider accepts, the resource provider's contact information, and an indication of whether the resource provider is immediately available, and by what device the resource provider is immediatly available. Unlike step 403 in FIG. 4, step 503 is not an auction. Rather, step 503 is a gathering of information for the patron so that he or she can decide with whom he or she desires to communicate. It will be clear to those skilled in the art how to enable data processing system 101 to perform step 503.

At step 504, data processing system 101 transmits, via data network 103, a list of the candidate resource providers received in step 504 and their summary information to the network terminal associated with the patron. This is to enable the patron to select which resource provider with whom to communicate and to provide the patron with some information on which to reasonably base the decision. It will be clear to those skilled in the art how to enable data processing system 101 to perform step 504.

At step 505, data processing system 101 receives an indication of candidate resource provider with whom the patron desires to communicate. Step 505 is advantageously identical to step 306 in FIG. 3.

At step 506, data processing system 101 automatically initiates a telecommunication session between the patron and the resource provider indicated in step 505. Step 506 is advantageously identical to step 205 as described above with respect to FIG. 2.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

The invention claimed is:

1. A computer implemented method of operating a data processing system, said method comprising:

compiling a database of resource providers and their associated information, wherein said associated information for each of said resource providers includes one or more keywords that are indicative of said resource provider, a summary of said resource provider's terms and conditions for providing resources, an indication of what types of telecommunication sessions said resource provider accepts, said resource provider's contact information, an indication of whether said resource provider is immediately available, and by what devices said resource provider is available;

receiving contact information and preferences from a patron, wherein said contact information and preferences include an indication of whether said patron desires to communicate with at least one resource provider via voice, video, or text telecommunications session via a public switched telephone network, and, if so, said patron's contact information for such session; via voice, video, or text telecommunications session via a data network, and, if so, said patron's data network address for such session; and immediately or not;

receiving a request from said patron to find a resource provider to provide a resource;

conducting, via a data network, an auction to identify the lowest cost resource provider willing to provide said resource sought by said patron, said auction comprising a traditional bid/ask auction, a dutch auction, or a reverse auction involving at least two resource providers from said database that are willing to provide said resource to said patron;

determining which resource provider is the lowest cost resource provider; and initiating a telecommunication session between said patron and said lowest cost resource provider.

2. The method of claim 1 wherein said telecommunication session is a voice telecommunications session and said telecommunication session is established via a public switched telephone network.

3. The method of claim 1 wherein said telecommunication session is a voice telecommunications session and said telecommunication session is established via said data network.

4. The method of claim 1 wherein said telecommunication session is text telecommunication session and said telecommunication session is established via said data network.

5. The method of claim 1 wherein an operator of said data processing system selects said resource provider based on whether said resource provider is immediately available to communicate with said patron.

6. The method of claim 5 wherein said telecommunication session is a voice telecommunications session and said telecommunication session is established via a public switched telephone network.

7. The method of claim 5 wherein said telecommunication session is a voice telecommunications session and said telecommunication session is established via said data network.

8. The method of claim 5 wherein said telecommunication session is text telecommunication session and said telecommunication session is established via said data network.

9. The method of claim 5 wherein said data processing system is a world wide web site and said data network is the Internet.

10. A data processing system comprising:
a database of resource providers and their associated information, wherein said associated information for each of said resource providers includes one or more keywords that are indicative of said resource provider, a summary of said resource provider's terms and conditions for providing resources, an indication of what types of telecommunication sessions said resource provider accepts, said resource provider's contact information, an indication of whether said resource provider is immediately available, and by what devices said resource provider is available;

means for receiving contact information and preferences from a patron, wherein said contact information and preferences include an indication of whether said patron desires to communicate with at least one resource provider via voice, video, or text telecommunications session via a public switched telephone network, and, if so, said patron's contact information for such session; via voice, video, or text telecommunications session via a data network, and, if so, said patron's data network address for such session; and immediately or not;

means for receiving a request from said patron to find a resource provider to provide a resource;

means for conducting, via a data network, an auction to identify the lowest cost resource provider willing to provide said resource sought by said patron, said auction comprising a traditional bid/ask auction, a dutch auction, or a reverse auction involving at least two resource providers from said database that are willing to provide said resource to said patron;

means for determining which resource provider is the lowest cost resource provider; and means for initiating a telecommunication session between said patron and said lowest cost resource provider.

11. The method of claim 10 wherein said telecommunication session is a voice telecommunications session and said telecommunication session is established via a public switched telephone network.

12. The method of claim 10 wherein said telecommunication session is a voice telecommunications session and said telecommunication session is established via said data network.

13. The method of claim 10 wherein said telecommunication session is text telecommunication session and said telecommunication session is established via said data network.

14. The method of claim 10 wherein an operator of said data processing system selects said resource provider based on whether said resource provider is immediately available to communicate with said patron.

15. The method of claim 14 wherein said telecommunication session is a voice telecommunications session and said telecommunication session is established via a public switched telephone network.

16. The method of claim 14 wherein said telecommunication session is a voice telecommunications session and said telecommunication session is established via said data network.

17. The method of claim 14 wherein said telecommunication session is text telecommunication session and said telecommunication session is established via said data network.

18. The method of claim 14 wherein said data processing system is a world wide web site and said data network is the Internet.

* * * * *